United States Patent [19]

Licht et al.

[11] Patent Number: 5,549,991
[45] Date of Patent: Aug. 27, 1996

[54] ALUMINUM PERMANGANATE BATTERY

[75] Inventors: Stuart L. Licht, Charlton City, Mass.; Catherine L. Marsh, Exeter, R.I.

[73] Assignee: The United States of America as represented by the Secretary of the Navy, Washington, D.C.

[21] Appl. No.: 168,788

[22] Filed: Nov. 30, 1993

[51] Int. Cl.$^6$ ........................................ H01M 4/58
[52] U.S. Cl. ............................ 429/218; 429/188; 429/189
[58] Field of Search ............................ 429/218, 188, 429/189

[56] References Cited

U.S. PATENT DOCUMENTS 3,920,474  11/1975  Zito, Jr. et al. .
4,988,585   1/1991  O'Hara et al. .
5,196,274   3/1993  Popravsky ............................ 429/13

OTHER PUBLICATIONS

D. D. MacDonald, et al."Development of Anodes for Aluminum/Air Batteries–Solution phase Inhibition of Corrosion" J. Appl. Electrochen (1990) 20(3) pp. 405–417.
T. A. Turney"Oxidation Mechanisms" (1965) Butterworths Press (Washington) pp. 110–111.

Primary Examiner—George Fourson
Assistant Examiner—C. Everhart
Attorney, Agent, or Firm—Michael J. McGowan; Prithvi C. Lall; Michael F. Oglo

[57] ABSTRACT

A battery is provided comprising an aluminum anode, an aqueous solution of permanganate as the cathodic species and a second electrode capable of reducing permanganate. Such a battery system is characterized by its high energy density and low polarization losses when operating at high temperatures in a strong caustic electrolyte, i.e., high concentration of hydroxyl ions. A variety of anode and electrocatalyst materials are suitable for the efficient oxidation-reduction process and are elucidated.

28 Claims, 4 Drawing Sheets

ALUMINUM PERMANGANATE BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to an aluminum-permanganate battery and more particularly to an aluminum-permanganate battery wherein the permanganate is in solution.

(2) Description of the Prior Art

Presently, a high power density primary battery based on aluminum and silver oxide alkaline half cells provides sufficient energy for vehicle propulsion. Major advantages of this electrochemical system are the high theoretical energy density, in excess of 900 Watts-hours/Kilogram (W-hrs/kg), and the extraordinary current and power densities, in excess of 1 ampere/cm$^2$ and 1 watt/cm$^2$ which respectively are readily achieved. The high current densities are indicative of facile electron transfer in both the anodic and the cathodic redox couples. However, a major disadvantage of the alkaline aluminum silver oxide primary battery is the significant cost of the cathode. Many attempts have been made to address the issue of cost. As an example, Anderson, U.S. Pat. No. 3,953,239, discloses a primary battery comprising aluminum and silver oxide in alkaline electrolyte for the generation of power. Hunter, U.S. Pat. No. 5,004,56; Tarcy, U.S. Pat. No. 4,950,650; Moden, U.S. Pat. Nos. 4,107,406, and 4,150,204; Pryor, U.S. Pat. No. 3,189,486; and Bohnstedt, GB No. 2020478 disclose solid and solution phase aluminum anode modifications, and do not indicate coupling such an anode with a permanganate cathode for electrochemical energy storage. Aqueous permanganate is a strong oxidant which readily attacks aluminum and therefore had not been previously considered for electrochemical storage in such a media.

Even anodes less electronegative than aluminum will also react when in contact with solution phase permanganate. This necessity and requirement to prevent solution phase permanganate from reaching the anode was recognized in the (zinc) alkaline dry cell of U.S. Pat. Nos. 3,620,848 and 3,799,959. In particular, Epstein et al use an insoluble permanganate to physically separate and prevent permanganate interaction with the anode. It has been proposed in U.S. Pat. Nos. 3,620,848 and 3,7999,959 to provide alkaline dry cells wherein an insoluble alkyl ammonium permanganate salt is used as a cathode. The low conductivity, high molecular weight and organic nature of these salts result in cathode limitations. Even with graphite powder added to the insoluble permanganates, conductivity remains low. The cathode will therefore only support low current densities. The high molecular weight of the organic cation results in diminished theoretical faradic capacity and energy density.

It would thus be desirable to provide a battery capable of producing high current densities and high charge capacity. In addition, it would be desirable to provide such a battery formed of relatively inexpensive materials for forming the cathode, anode and electrolyte.

It is an object of subject invention to have a battery which is formed of relatively inexpensive materials for the cathode, anode and electrolyte thereof.

Another object of the invention is to have a battery which is capable of producing high current densities.

Still another object of subject invention is to provide a battery which has high charge capacity.

SUMMARY OF THE INVENTION

This invention provides a battery which comprises an aluminum anode, a permanganate electrolyte and a second electrode capable of reducing permanganate. The permanganate electrolyte is dissolved in an aqueous alkaline, seawater or alkaline-seawater solution. The overall electrochemical reaction for the battery is shown by Equation 1 or 2.

$$Al + MnO_4^- + 2 H_2O \rightarrow Al(OH)_4^- + MnO_2, \quad E_{cell}=2.9V \tag{1}$$

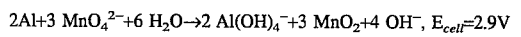

$$2Al + 3 MnO_4^{2-} + 6 H_2O \rightarrow 2 Al(OH)_4^- + 3 MnO_2 + 4 OH^-, \quad E_{cell}=2.9V \tag{2}$$

It is well known (Epstein et al) that permanganate reacts chemically with non-noble metals. In particular the rapid rate of the aluminum chemical reaction with permanganate, makes it highly unexpected that aluminum, in contact with solution phase permanganate, can be efficiently oxidized to produce electrochemically stored energy. Furthermore, substantial aluminum storage capacity is achieved by discharging at high rates, which favors the electrochemical rather than the competing chemical permanganate reaction. The performance of the battery is enhanced by elevated temperatures and high electrolyte flow rates as well as low cathode and anode polarization losses which facilitate high rates of aluminum/permanganate battery discharge. The theoretical aluminum/permanganate battery voltage is 250 millivolts greater than the comparable aluminum/silver oxide cell presently available. The faradic storage capacity of the battery of this invention compares favorably with the presently available aluminum/silver oxide battery. The aluminum anode is in excess at 178.8 ampere-minutes/gram of material in either system; therefore, the theoretical storage capacity of the cathodes must be compared. The storage capacity of the permanganate (with the potassium cation) is 30.53 ampere-minutes/gram $KMnO_4$ which is considerably higher than the 25.97 ampere-minutes/gram for silver oxide, AgO. Thus, an overall theoretical energy capacity for the $Al/KMnO_4$ couple of 1300 W-hrs/kg of active material surpasses the presently available aluminum/silver oxide theoretical capacity of 1000 W-hrs/kg of active material.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

A battery using the teachings of subject invention is described using the accompanying drawings wherein.

DESCRIPTION OF PREFERRED EMBODIMENTS

Figure 1:
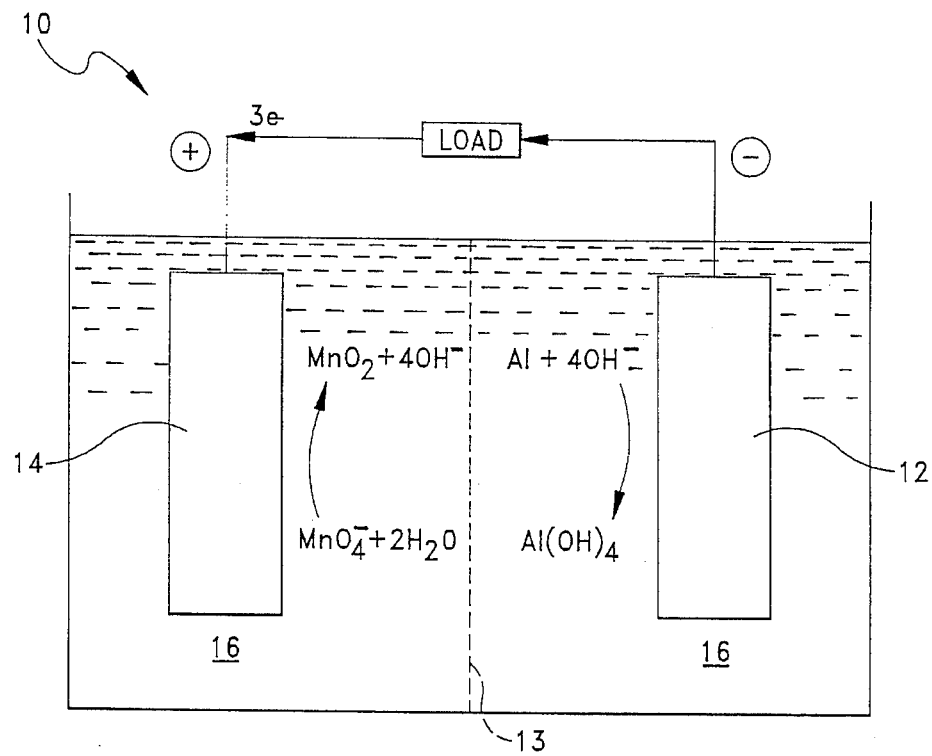
FIG. 1 is a diagrammatic representation of an electrochemical storage cell based on an aluminum and permanganate oxidation reduction couple.

The present invention provides a battery which is based upon the following electrochemical reactions:

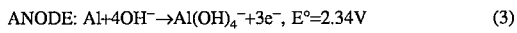

ANODE: $Al+4OH^- \rightarrow Al(OH)_4^- +3e^-$, $E°=2.34V$ (3)

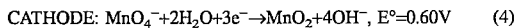

CATHODE: $MnO_4^- + 2H_2O + 3e^- \rightarrow MnO_2 + 4OH^-$, $E°=0.60V$ (4)

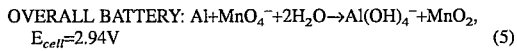

OVERALL BATTERY: $Al+MnO_4^- + 2H_2O \rightarrow Al(OH)_4^- + MnO_2$, $E_{cell}=2.94V$ (5)

Thus, Equations (5) and (1) are the same.

The anode of the battery of this invention can be pure aluminum which is readily available at a purity of at least about 99.9% or an aluminum alloy. The aluminum alloy has a composition which permits the electrochemical reaction at the anode to proceed as set forth above by Equation 2. Representative suitable alloys include aluminum-tin, aluminum-magnesium, aluminum-tin-gallium, aluminum-magnesium-tin, aluminum-indium-tin, aluminum-magnesium-indium-gallium or the like.

The electrolyte utilized in the battery of this invention comprises an aqueous permanganate solution wherein the concentration of permanganate is at least about 0.001 molal, preferably 0.5 molal up to the capacity of the solution to retain permanganate. Suitable soluble permanganate salts which can be utilized include the potassium, sodium, magnesium, aluminum, cesium, ammonium, calcium, barium or lithium salts of permanganate or mixtures thereof. The permanganate salt solution may also contains an alkaline compound, seawater or mixture of an alkaline compound and seawater electrolyte. Suitable alkaline hydroxide compounds include those with a cation selected from the group of lithium, sodium, potassium, cesium, ammonium, magnesium, calcium, barium and aluminum; alkaline salts include the halides, nitrates and sulfates with a cation selected from the group lithium, sodium, potassium, cesium, ammonium, magnesium, calcium, barium and aluminum and mixtures thereof or the like. Generally, the alkaline compound and/or seawater is present in an amount in order to input a conductivity to the solution of at least 0.001 millimho/cm, preferably at least 100 millimho/cm.

A second electrode is required to complete the battery circuit and is formed of a metal capable of catalyzing the circuit and is formed of a metal capable of catalyzing the permanganate reduction illustrated by Equation 3. Representative suitable materials for forming the second electrode include planar, porous, and high surface area electrodes composed of platinum, palladium, nickel, copper, manganese, zinc, lead, cobalt, molybdenum, iridium, stainless steel or alloys thereof or composite electrodes formed of a plurality of layers of these metal or alloy compositions. An alternate choice for the electrocatalytic cathode might be a carbon electrode such as graphite; or insoluble oxidized metals such as but not limited to nickel oxide or nickel sulfide. A preferred electrode is formed of high porosity nickel since it provides a high surface area which allows access to high current densities, for example 2000 mAmps/cm$^2$.

The batteries of this invention may undergo further discharge resulting in even a higher storage capacity as illustrated by Equations 6 and 7.

$MnO_2 + 2H_2O + 2e^- \rightarrow Mn(OH)_2 + 2OH^-$, $E°=-0.1V$ (6)

$2MnO_2 + 2H_2O + 2e^- \rightarrow Mn_2O_3 + 2OH^-$, $E°=-0.1V$ (7)

As shown in FIG. 1, cell 10 is a diagrammatic represenation of an electrochemical storage cell based on the aluminum and permanganate redox couples. Specifically, cell 10 contains an aqueous solution of the electrolyte 16 in contact with an electrocatalytic cathode 14. Reduction of $MnO_4^-$ anions to $MnO_2$ anions is achieved via electrons available from electrode 14. Aluminum electrode 12 is also in contact with the solution. Electrons are released in the oxidation of aluminum from the zero valent to the 3+ oxidation state. More specifically, solution 16 contains $KMnO_4-$ and KOH. In use, it is preferred to operate this invention at elevated temperatures. The cell may optionally include a membrane 13 positioned to separate the solutions surrounding the two electrodes.

Figure 2:
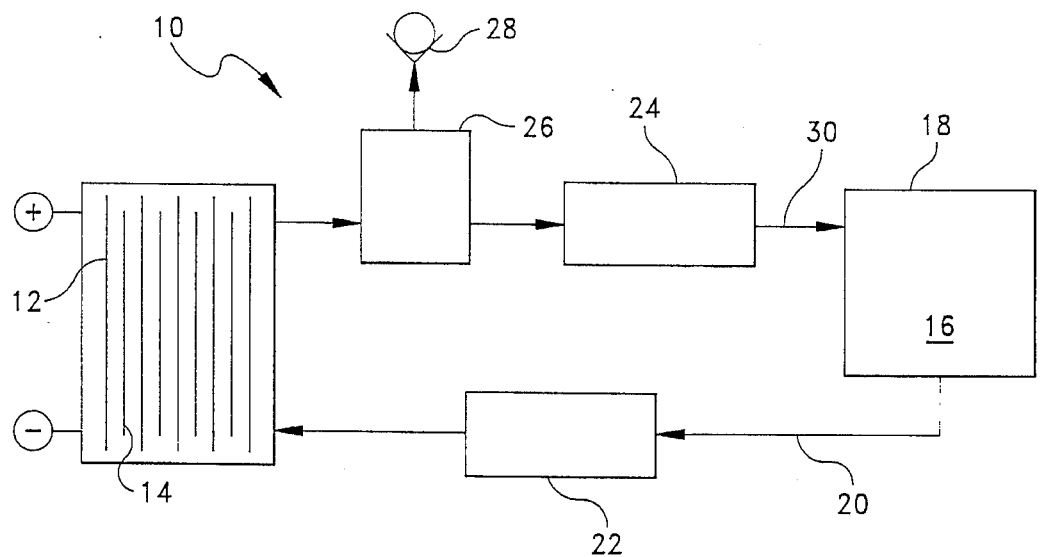
FIG. 2 is a schematic diagram of a system utilizing the battery structure of this invention.

Since it is preferred to operate the battery of this invention at elevated temperatures, the temperature is conveniently controlled by flowing the electrolyte between the battery housing and a heater by any conventional means. An effective means for operating the battery of this invention is shown in FIG.2. The battery 10 includes an aluminum anode 12, a second electrode 14 and a permanganate electrolyte 16 stored in reservoir 18. The electrolyte 16 is removed from the reservoir 18 through conduit 20 by means of pump 22 and is cycled to heat exchanger 24 through gas-liquid separator 26 and valve 28. The heat exchanger 24 provides for either heating or heat dissipation of the electrolyte 16. The electrolyte from heat exchanger 24 is returned to battery 10 through electrolyte reservoir 18 and conduit 30.

The following examples illustrate the present invention and are not intended to limit the same.

EXAMPLE I

Figure 3:
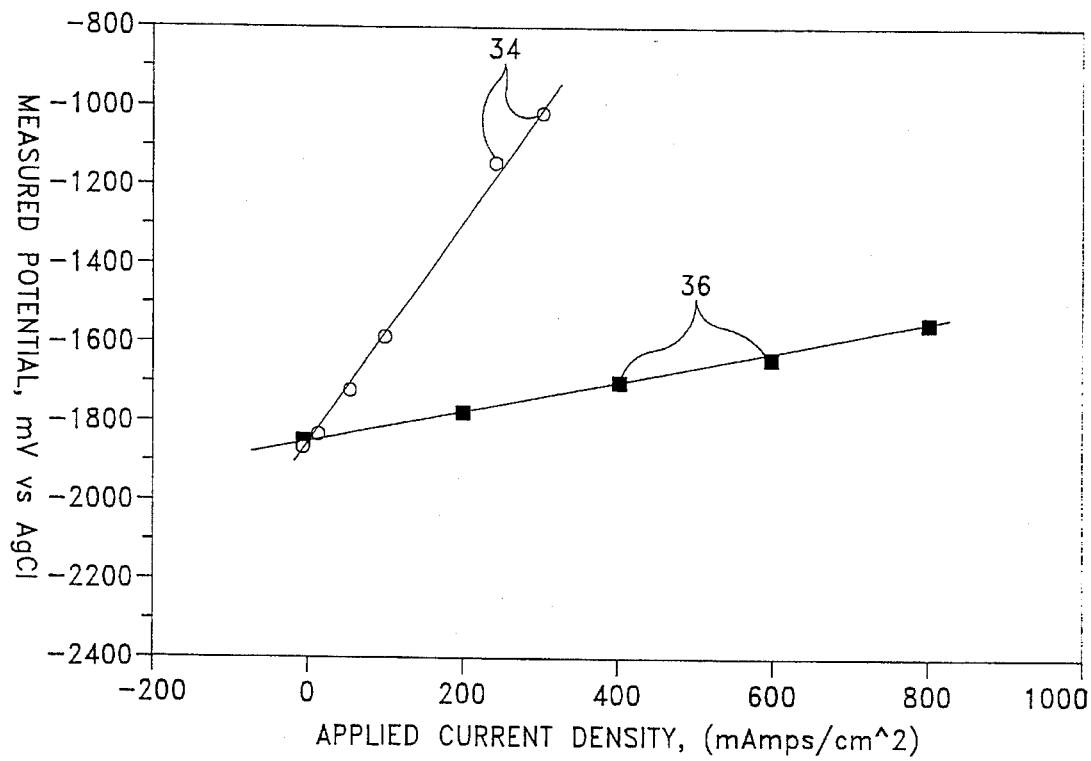
FIG. 3 illustrates a graphic representation of the potential at different currents for the aluminum anode in a permanganate solution.

This example illustrates the capability of the anode of the aluminum-permanganate battery of this invention to obtain very high anodic discharge currents. FIG. 3 illustrates the rapid accessibility to and minimum polarization losses associated with the electrical charge stored in the aluminum anode electrode as discharged in a 3 m KOH–0.2 m $KMnO_4$ aqueous electrolyte for aluminum anodes of varying composition. Measurements of potential at the anode were made both at open circuit and at varying galvanostatic current densities. The higher the potential (considered in an absolute sense ignoring the negative sign) the better the battery. The measurements were made with respect to a standard silver/silver chloride electrode.

The results with the open circuit are shown in Table 1.

TABLE 1

| Temp (°C.) | Al. Anode Type | Potential vs Ag/AgCl Volts | Polarization mV-cm²/mA |
| --- | --- | --- | --- |
| 55 | 99.999% pure | −1.85 | 2–3 |
| 90 | 99.999% pure | −1.87 | 0.4 |
| 90 | Al Alloy XA5-P | −1.83 | 0.35 |
| 90 | 99.95% pure | −1.79 | 0.5 |

A graph of measured potential of each anode as a function of applied current density of the closed circuit is shown in FIG. 3 wherein the aluminum anode 12 is electrochemically and not chemically oxidized. The plot with the open circles is made with the aluminum anode at 55° C. and the plot with the blackened squares such as 36 is made with the aluminum alloy (XA5-P obtained from ALCAN, Int. Ltd., Kingston, Ontario, Canada).

EXAMPLE II

This example illustrates the capability of the cathode 14 of the battery of this invention to attain very high cathodic discharge currents. The cathode was comprised of a flat plate platinum foil, or an 80 pore per inch porous nickel coated with iridium and/or palladium immersed in electrolyte. The electrolyte 16 was a 3.0 Molar (M) KOH, 0.2M KMnO$_4$ aqueous solution. The potential obtained upon application of a fixed galvanostatic current was measured at various temperatures and results are shown in Table 2. The results are relative to a standard silver/silver chloride electrode.

TABLE 2

| Temp. (°C.) | E° vs Ag/AgCl (Volts) | Polarization mV-cm²/mA | Passivation mA/cm² |
| --- | --- | --- | --- |
| 84 | 0.41 | −0.8 | −450 |
| 55 | 0.42 | −1.1 | −250 |
| 26 | 0.44 | −2.3 | −100 |

Similar results of potential upon application of a fixed galvanostatic current at different electrocatalytic cathode surfaces are shown in Table 3.

TABLE 3

| Temp. (°C.) | Cathode Material | E° (V) | Polarization mVcm²/mA | Passivation mA/cm² |
| --- | --- | --- | --- | --- |
| 84 | Flat Pt. | 0.41 | −0.78 | −450 |
| 82 | Porous Ni | 0.41 | −0.29 | |
| 82 | Pd—Ir on Porous Ni | 0.41 | −0.28 | |
| 94 | Pd—Ir on Porous Ni | 0.40 | −0.27 | −2200 |

Figure 4:
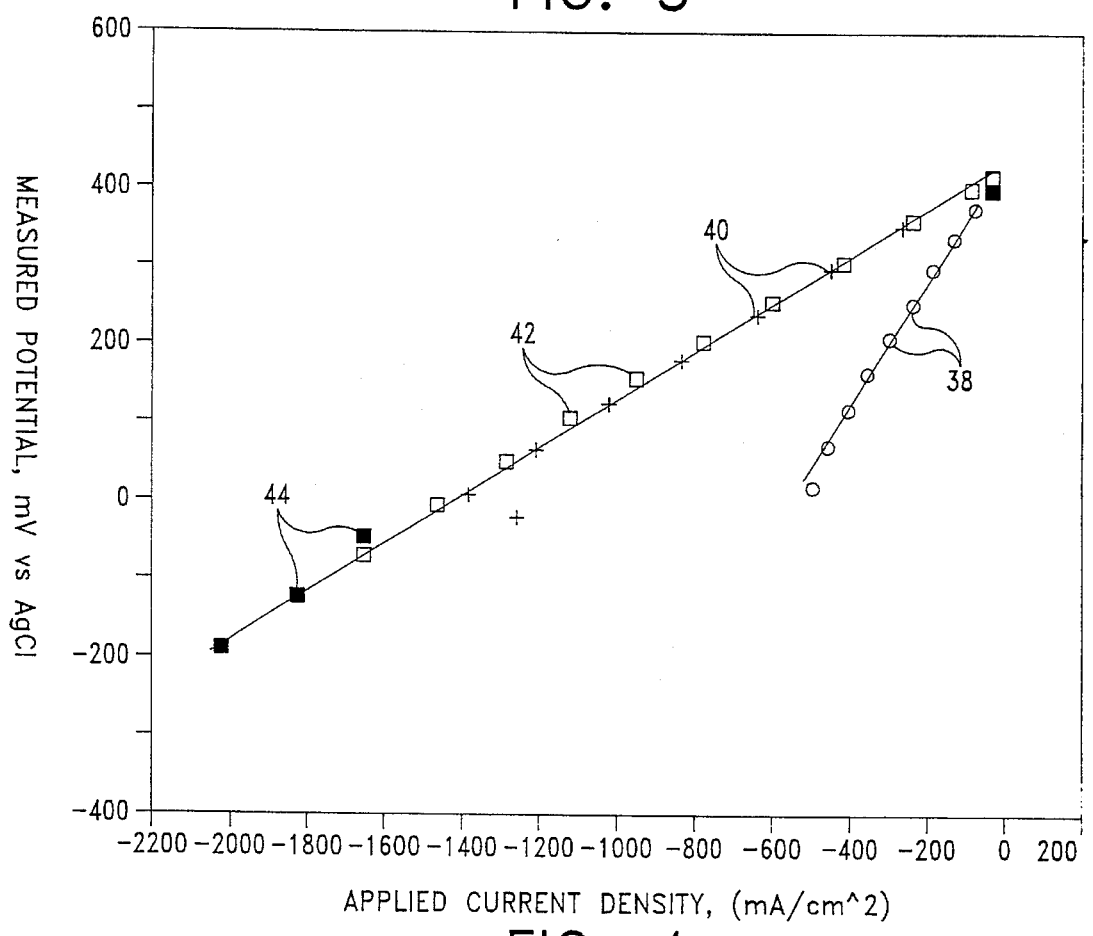
FIG. 4 graphically illustrates the potential at different currents for the cathode of this invention using an 80 pore per inch porous nickel electrocatalyst.

As shown in these Tables, suitable electrocatalytic cathode materials include planar platinum, porous nickel and porous nickel coated with palladium and iridium. Planar nickel also has been found to be suitable. Comparison of Tables 2 and 3 indicate that high surface area materials such as porous nickel are capable of maintaining higher cathodic current densities than planar surfaces. Furthermore, coating the nickel surfaces with iridium and/or palladium does not effect the cathode performance. As shown in FIG. 4, high current densities without significant polarization losses are obtained with the various electrocatalytic electrodes in the batteries of this invention and permanganate cathodic current densities are maintained in excess of 2 Amps/cm². In FIG. 4, the circular points 38 were obtained at 84° C. with flat Pt; the cross points 40 were obtained at 82° C. with Reticulated Ni, the open square points 42 were obtained with Reticulated Ni coated with Pd and Ir at 82° C. and the filled square points 44 were obtained at 94° C. with Reticulated Ni coated with Pd and Ir.

EXAMPLE III

Figure 5:
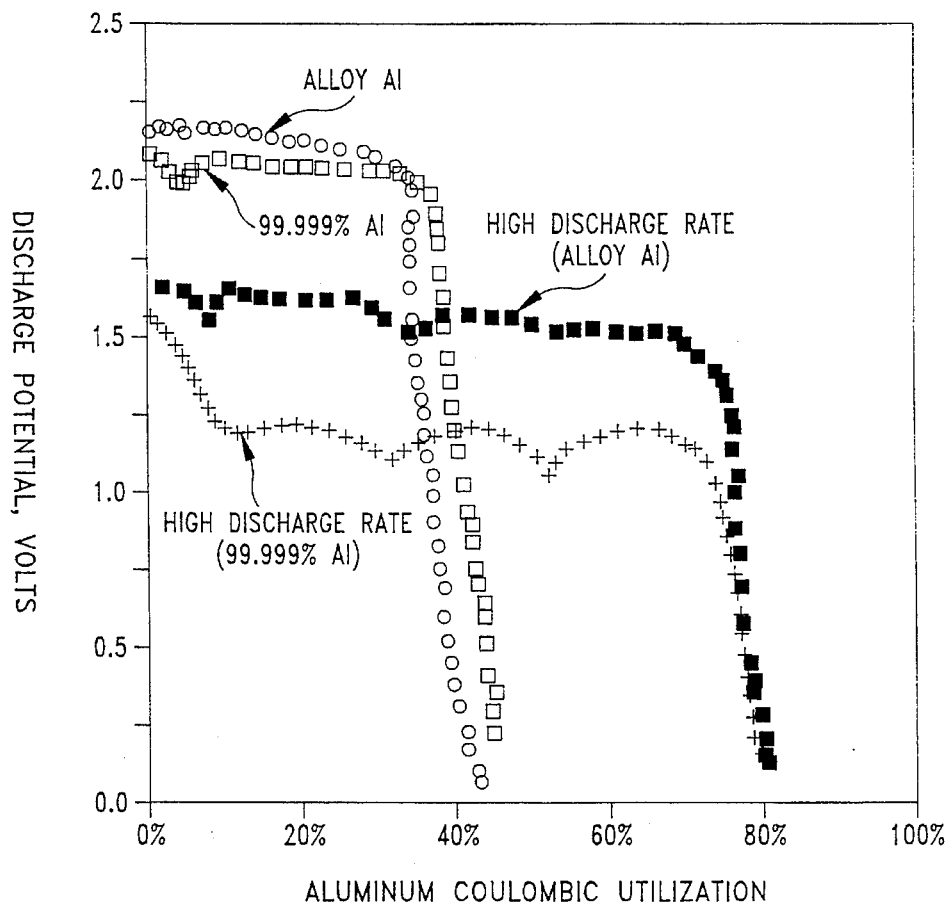
FIG. 5 illustrates the variation of discharge characteristics of the battery of this invention as a function of applied load and anode composition.

This example illustrates that under conditions of high discharge rates a significant fraction of the theoretical aluminum storage capacity may be experimentally realized in an aluminum/permanganate battery. This example also illustrates that this high coulombic utilization may be accessed with batteries containing either a 99.999% Al or an Al alloy anode. FIG. 5 illustrates the efficient utilization of the aluminum battery material. The battery utilized a stirred 100° C. aqueous electrolyte comprised of 63.3 g H$_2$O with 3 m KOH, 0.3 m KMnO$_4$ and 0.006 m Na$_2$SnO$_3$. The cell also utilized an Al electrode (0.5 millimeter thick by 0.6 cm²) separated by 1 millimeter from a 100 pore per inch porous nickel electrocatalytic electrode (1.5 millimeter thick by 0.6 cm²). Additionally, the electrolyte for the 99.999% Al anode battery discharges contained 0.0006 m Ga$_2$O$_3$. The electrodes were externally connected through the resistive load, and measurements were made of the cell potential and charge generated. The applied load was either a 7.2 ohm resistor or a 2.3 ohm resistor to maintain high discharge rate conditions. High discharge rate conditions resulted in a current density of 1.6 A/cm². As can be seen in FIG. 5, the storage efficiency of aluminum nearly doubled to 80% under conditions of high discharge. Under these conditions, the electrochemical discharge dominates over chemical reactions of aluminum and permanganate. The high coulombic utilization of aluminum for both 99.999% or alloyed anodes demonstrates that substantial electrochemical energy can be generated in a system in which aluminum is in direct contact with solution phase permanganate. Very high power densities of 2 to 3 W/cm² can be maintained during the discharge.

EXAMPLE IV

Figure 6:
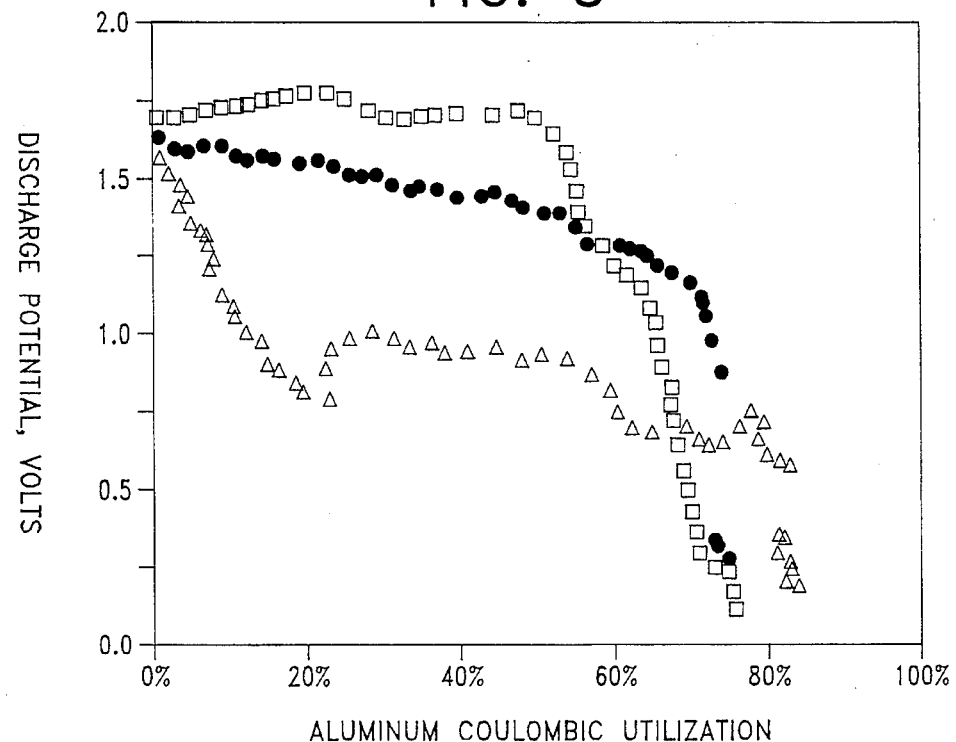
FIG. 6 illustrates graphically a demonstration of the variation of discharge characteristics of the battery of this invention with tin solution additives.
Figure 7:
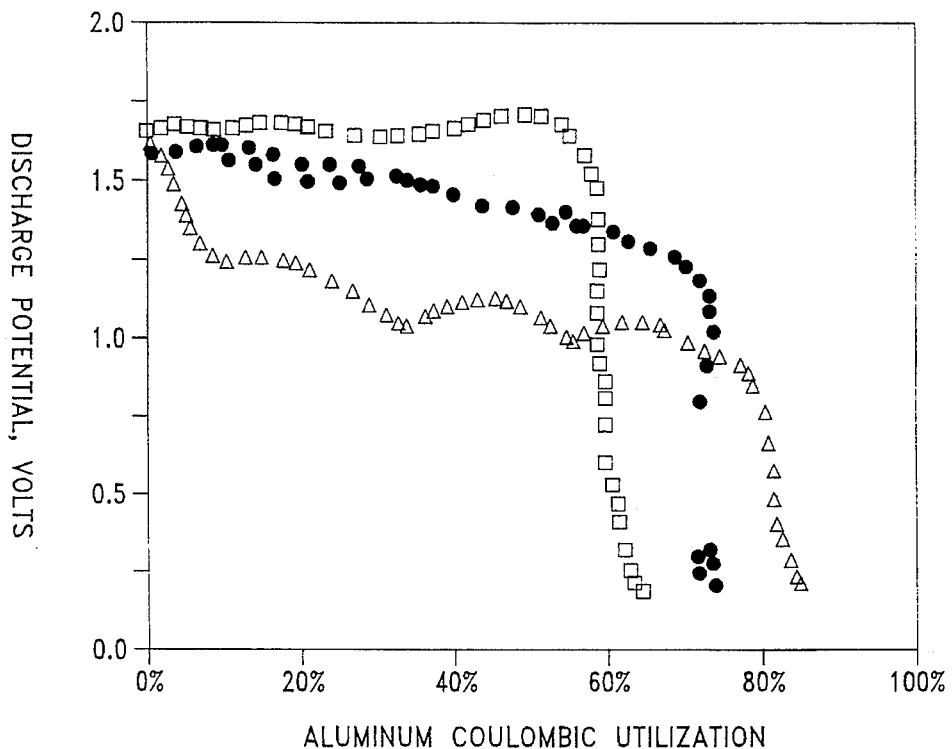
FIG. 7 is a graphical representation of the variation of discharge characteristics of the battery of this invention with gallium solution additives.

This example illustrates the effects of solution phase additives on the aluminum permanganate battery containing a 99.999% Al anode under the experimental conditions described for FIG. 5. FIG. 6 illustrates the effects of adding either 0.6 mm, 6 mm or 60 mm Na$_2$SnO$_3$ respectively to the permanganate electrolyte. As shown in the FIG. 6, added Na$_2$SnO$_3$ increases the aluminum permanganate discharge potential under a 2.2 ohm load by up to 0.7 volts. FIG. 7 illustrates the effects of adding either 0.6 mm, 2 mm or 6 mm Ga$_2$O$_3$ respectively to the permanganate electrolyte. As shown in FIG. 7, added Ga$_2$O$_3$ increases the aluminum permanganate discharge potential under a 2.2 ohm load by up to 0.6 volts, but diminishes the storage capacity of the aluminum from 80% to 60%.

EXAMPLE V

Figure 8:
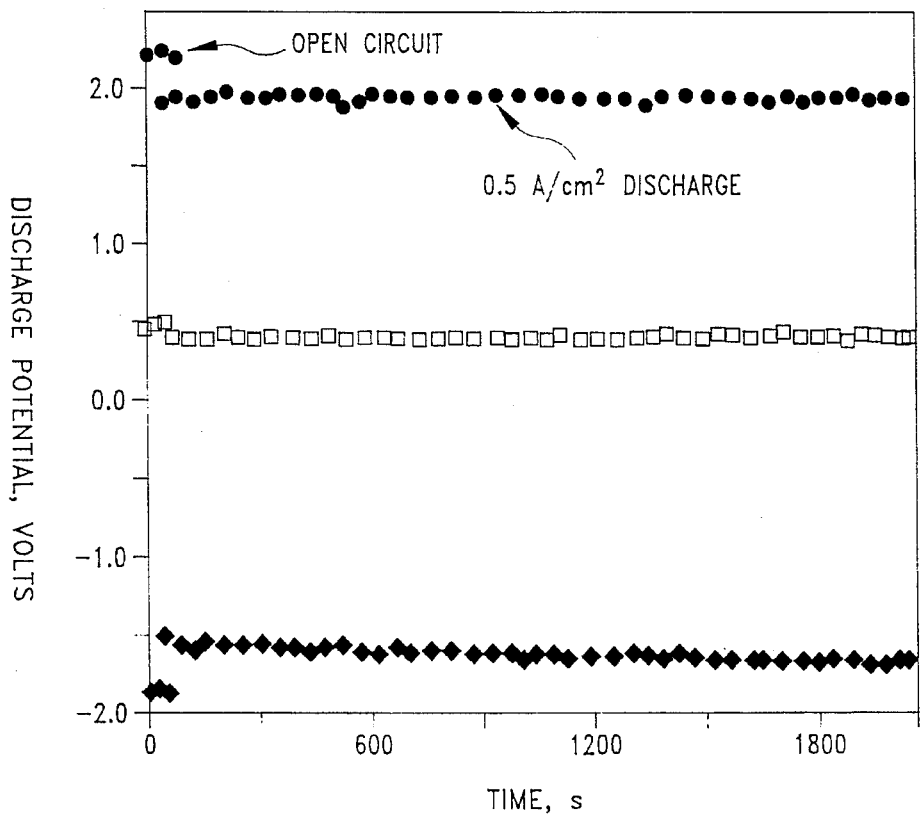
FIG. 8 illustrates graphically the variation of full cell potential, of cathode potential and of anode potential during discharge of the battery of this invention.

This example demonstrates stable full cell potential, cathode potential and anode potential during discharge at 500 mA/cm² for a discharge of the Al permanganate battery. The cell, illustrated in FIG. 8, uses the Al alloy anode and is discharged over a 7.2 ohm resistive load at 77° C. with all other conditions as described in Example III. Moreover, the cell responds rapidly and reversibly to a disruption in the load. Several scale up versions of the new aluminum/permanganate battery have been constructed and initial tests have been successfully performed on cells of 0.5, 4.5, 18 and over 60 cm². Preliminary testing on the largest of these cells operated with rapid forced electrolyte flow generated voltages of 2.22, 2.14, 2.03, 1.95, 1.80 and 1.67 volts at 200, 400, 600, 800, 1000 and 1200 mA/cm² respectively. The measurements were made during a battery discharge comprised of an aluminum anode with a surface area of 68 cm², a catholyte of 0.5 molal(m) $KMnO_4$, an electrocatalytic cathode of porous nickel and a 3 m KOH electrolyte at a temperature of 105° C.

In light of the above, it is understood that within the scope of the appended claims, the invention may be practiced otherwise than as specifically described.

There is thus described a battery including an aluminum anode, a permanganate electrolyte and a second electrode which is capable of reducing permanganate. The permanganate electrolyte is dissolved in an aqueous alkaline seawater solution. It should be noted that the embodiments described are to be considered for illustration and not as limitation. It will be manifested to those skilled in the art that various modifications may be made without deviating from the teachings of subject inventive concept herein described except in so far as indicated by the scope of the appended claims.

What is claimed is:

1. An electrical storage cell comprising two electrochemical half cells positioned in electrochemical contact with one another, at least one of said two half cells comprising:

an aqueous salt solution comprising permanganate anions;

a current transferring electrocatalytic electrode positioned in electron-transferring contact with said aqueous solution; and the remaining half cell of said half two cells comprising a pure aluminum or aluminum alloy anode material which is in direct contact with said aqueous solution of permanganate anions.

2. The electrical storage cell of claim 1 wherein said aqueous salt solution includes solid phase permanganate salts.

3. The electrical storage cell of claim 1 wherein said electrocatalytic electrode comprises a porous material.

4. The electrical storage cell of claim 3 wherein said porous material is nickel.

5. The electrical storage cell of claim 1 in which said electrocatalytic electrode includes a metal having an insoluble metal permanganate salt.

6. The electrical storage cell of claim 5 wherein the said metal is a member of the group of metals consisting of copper, cobalt, manganese, molybdenum, iridium, zinc, lead, platinum, palladium, nickel and alloys thereof.

7. The electrical storage cell of claim 1 in which said electrocatalytic electrode is a carbon electrode.

8. The electrical storage cell of claim 7 wherein said carbon electrode includes graphite.

9. The electrical storage cell of claim 1 wherein said aqueous salt solution further includes a permanganate salt containing at least one cation selected from the group consisting of $Li^+$ ions, $Na^+$ ions, $K^+$ ions, $Cs^+$ ions, $NH_4^+$ ions, $Mg^{2+}$ ions, $Ca^{2+}$ ions, $Ba^{2+}$ ions and $Al^{3+}$ ions.

10. The electrical storage cell of claim 1 wherein said aqueous salt solution includes a hydroxide compound.

11. The electrical cell of claim 10 wherein said hydroxide include compounds with at least one cation selected from the group consisting of $Li^+$ ions, $Na^+$ ions, $K^+$ ions, $Cs^+$ ions, $NH_4^+$ ions, $Mg^{2+}$ ions, $Ca^{2+}$ ions, $Ba^{2+}$ ions, and $Al^{3+}$ ions.

12. The electrical storage cell of claim 1 wherein said aqueous salt solution includes a mixture of 3M KOH and 0.2M $KMnO_4$.

13. The electrical storage cell of claim 12 wherein said salt is selected from the group consisting of a halide, nitrate sulfate and those with at least one cation selected from the group consisting of $Li^+$ ions, $Na^+$ ions, $K^+$ ions, $Cs^+$ ions, $NH_4^+$ ions, $Mg^{2+}$ ions, $Ca^{2+}$ ions, $Ba^{2+}$ ions and $Al^{3+}$ ions.

14. The electrical storage cell of claim 1 in which said aqueous salt solution has a conductivity within the range of from about 0.001 milli mho/cm to about 2 mho/cm.

15. The electrical storage cell of claim 1 in which said aqueous salt solution includes seawater.

16. The electrical storage cell of claim 1 in which an additive salt is added to said electrolyte solution to stabilize and/or enhance the performance of said anode.

17. The electrical storage cell of claim 16 wherein said additive salt is selected from the group consisting of sodium stannate, indium hydroxide and gallium oxide.

18. The electrical storage cell of claim 1 further comprising means for impeding transfer of chemically reactive species between said solution and said redox species of said other half cell.

19. The electrical storage cell of claim 18 in which said means for impeding chemically reactive ion transfer comprises a membrane positioned to separate said first solution from said redox species.

20. The electrical storage cell of claim 18 in which said membrane passes ions to effect ion current transfer.

21. The electrical storage cell of claim 1 which further includes a heat exchanger for controlling temperature of said permanganate and electrolyte solution.

22. The electrical storage cell of claim 1 which further includes a gas separator for controlling gas buildup in the cell.

23. The electrical storage cell of claim 1 which further includes a precipitate separator for controlling aluminate or other precipitate buildup in the cell.

24. The electrical storage cell of claim 1 which further includes an electrolyte reservoir to introduce and store said aqueous salt solution.

25. The electrical storage cell of claim 1 further including an electrolyte regulator to regulate the concentration of salts in said salt solution.

26. The electrical storage cell of claim 1 including a manifold to distribute flow within said storage cell.

27. The electrical storage cell of claim 1 further including a pump to circulate flow of said solution within said storage cell.

28. A method of generating a direct current between a first contact point and a second contact point which includes the steps of:

providing an aqueous salt solution comprising permanganate anions, said solution comprising 0.001 molal of permanganate concentration;

positioning a solid electron transferring electrode in electron-transferring contact with said aqueous salt solution and in electron-transferring contact with said second contact point;

providing an aluminum redox couple complementary to said permanganate anions, positioned in ion-current transferring contact with said aqueous solution and in electron-transferring contact with said second contact point; and establishing electrical contact with said first contact point and said second contact point whereby said permanganate anions are reduced and said aluminum is oxidized, generating an electrical current and potential between said first contact point and said second contact point.

\* \* \* \* \*